(12) United States Patent
Wang et al.

(10) Patent No.: US 11,430,485 B2
(45) Date of Patent: Aug. 30, 2022

(54) SYSTEMS AND METHODS FOR MIXING SYNTHETIC VOICE WITH ORIGINAL AUDIO TRACKS

(71) Applicant: Netflix, Inc., Los Gatos, CA (US)

(72) Inventors: Yadong Wang, Campbell, CA (US); Murthy Parthasarathi, Fremont, CA (US); Andrew Swan, Santa Clarita, CA (US); Raja Ranjan Senapati, Fremont, CA (US); Shilpa Jois Rao, Cupertino, CA (US); Anjali Chablani, Campbell, CA (US); Kyle Tacke, Glendale, CA (US)

(73) Assignee: Netflix, Inc., Los Gatos, CA (US)

(*) Notice: Subject to any disclaimer, the term of this patent is extended or adjusted under 35 U.S.C. 154(b) by 0 days.

(21) Appl. No.: 16/747,314

(22) Filed: Jan. 20, 2020

(65) Prior Publication Data
US 2021/0151082 A1    May 20, 2021

Related U.S. Application Data

(60) Provisional application No. 62/937,755, filed on Nov. 19, 2019.

(51) Int. Cl.
| | |
|---|---|
| *G11B 27/00* | (2006.01) |
| *H04N 5/93* | (2006.01) |
| *G11B 27/036* | (2006.01) |
| *G11B 27/034* | (2006.01) |
| *H04N 21/84* | (2011.01) |
| *G10L 13/08* | (2013.01) |
| *H04N 21/485* | (2011.01) |
| *H04N 21/81* | (2011.01) |

(Continued)

(52) U.S. Cl.
CPC .......... *G11B 27/036* (2013.01); *G10L 13/00* (2013.01); *G10L 13/08* (2013.01); *G11B 27/034* (2013.01); *H04N 21/4852* (2013.01); *H04N 21/8106* (2013.01); *H04N 21/84* (2013.01)

(58) Field of Classification Search
USPC ................................................. 386/248, 239
See application file for complete search history.

(56) References Cited

U.S. PATENT DOCUMENTS

| | | | |
|---|---|---|---|
| 9,774,911 B1 * | 9/2017 | Thomas | ............... H04N 21/234 |
| 10,157,604 B1 * | 12/2018 | Carter | ...................... H04R 3/12 |

(Continued)

*Primary Examiner* — Nigar Chowdhury
(74) *Attorney, Agent, or Firm* — FisherBroyles, LLP

(57) ABSTRACT

The disclosed computer-implemented method may include accessing an audio track that is associated with a video recording, identifying a section of the accessed audio track having a specific audio characteristic, reducing a volume level of the audio track in the identified section, accessing an audio segment that includes a synthesized voice and inserting the accessed audio segment into the identified section of the audio track, where the inserted segment has a higher volume level than the reduced volume level of the audio track in the identified section. The synthesized voice description can be used to provide additional information to a visually impaired viewer without interrupting the audio track that is associated with the video recording, typically by inserting the synthesized voice description into a segment of the audio track in which there is no dialog. Various other methods, systems, and computer-readable media are also disclosed.

20 Claims, 9 Drawing Sheets

(51) Int. Cl.
  *G10L 13/00* (2006.01)
  *H04N 9/80* (2006.01)

(56) References Cited

U.S. PATENT DOCUMENTS

| | | | |
|---|---|---|---|
| 10,370,093 B1* | 8/2019 | Beckman | G01S 1/753 |
| 2005/0097439 A1* | 5/2005 | Ikeda | G06F 16/58 |
| | | | 715/202 |
| 2007/0168864 A1* | 7/2007 | Yamamoto | G06F 16/739 |
| | | | 715/716 |
| 2007/0245243 A1* | 10/2007 | Lanza | H04N 21/4788 |
| | | | 715/723 |
| 2012/0027227 A1* | 2/2012 | Kok | H04R 25/305 |
| | | | 381/107 |
| 2013/0061143 A1* | 3/2013 | Eppolito | G06F 3/04847 |
| | | | 715/716 |
| 2013/0061144 A1* | 3/2013 | Eppolito | G06F 3/04847 |
| | | | 715/716 |
| 2013/0124984 A1* | 5/2013 | Kuspa | H04N 21/4307 |
| | | | 715/255 |
| 2013/0155179 A1* | 6/2013 | Corley | G06F 13/36 |
| | | | 710/308 |
| 2013/0304464 A1* | 11/2013 | Wang | G10L 21/0308 |
| | | | 704/233 |
| 2014/0071342 A1* | 3/2014 | Winograd | H04N 21/4532 |
| | | | 348/383 |
| 2015/0025896 A1* | 1/2015 | Purnhagen | G10L 19/002 |
| | | | 704/500 |
| 2015/0287043 A1* | 10/2015 | Michaelis | G06Q 10/10 |
| | | | 705/317 |
| 2015/0332732 A1* | 11/2015 | Gilson | G11B 27/005 |
| | | | 386/240 |
| 2015/0339097 A1* | 11/2015 | Squires | H04M 1/0291 |
| | | | 361/679.01 |
| 2016/0078442 A1* | 3/2016 | Shintani | H04L 63/0428 |
| | | | 705/75 |
| 2016/0124593 A1* | 5/2016 | Joi | G06Q 10/06312 |
| | | | 715/753 |
| 2016/0124596 A1* | 5/2016 | Doerring | G10L 19/00 |
| | | | 715/723 |
| 2017/0064244 A1* | 3/2017 | Abou Mahmoud | H04N 5/7605 |
| 2017/0280169 A1* | 9/2017 | Maness | H04N 21/43615 |
| 2018/0139565 A1* | 5/2018 | Norris | H04S 1/007 |
| 2018/0199113 A1* | 7/2018 | Chou | H04N 21/4394 |
| 2018/0350348 A1* | 12/2018 | Fukuda | G10L 21/003 |
| 2018/0358052 A1* | 12/2018 | Miller | G10L 15/265 |
| 2018/0376212 A1* | 12/2018 | Candelore | H04N 21/4728 |
| 2019/0018640 A1* | 1/2019 | Shintani | G09B 21/006 |
| 2019/0043518 A1* | 2/2019 | Li | H04R 3/005 |
| 2019/0069045 A1* | 2/2019 | Kahn | H04N 21/23418 |
| 2019/0090072 A1* | 3/2019 | Pedersen | H04R 25/505 |
| 2019/0198023 A1* | 6/2019 | Howson | G10L 25/24 |
| 2019/0333496 A1* | 10/2019 | Amedi | G10L 13/027 |
| 2020/0074992 A1* | 3/2020 | Xiong | G10L 25/78 |
| 2020/0118582 A1* | 4/2020 | Garland | G10L 25/51 |
| 2020/0150919 A1* | 5/2020 | Rand | G10L 15/08 |
| 2020/0186852 A1* | 6/2020 | Ramamurthy | H04N 21/8549 |
| 2020/0302112 A1* | 9/2020 | Helm | G06F 40/247 |
| 2020/0342223 A1* | 10/2020 | Mixter | G06F 3/167 |

* cited by examiner

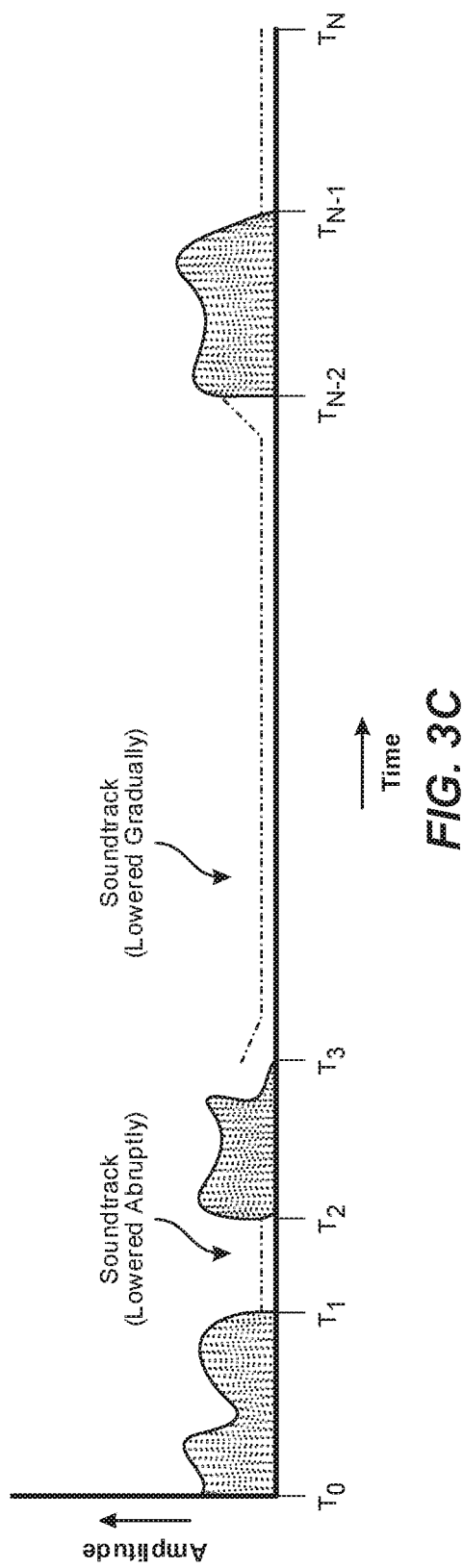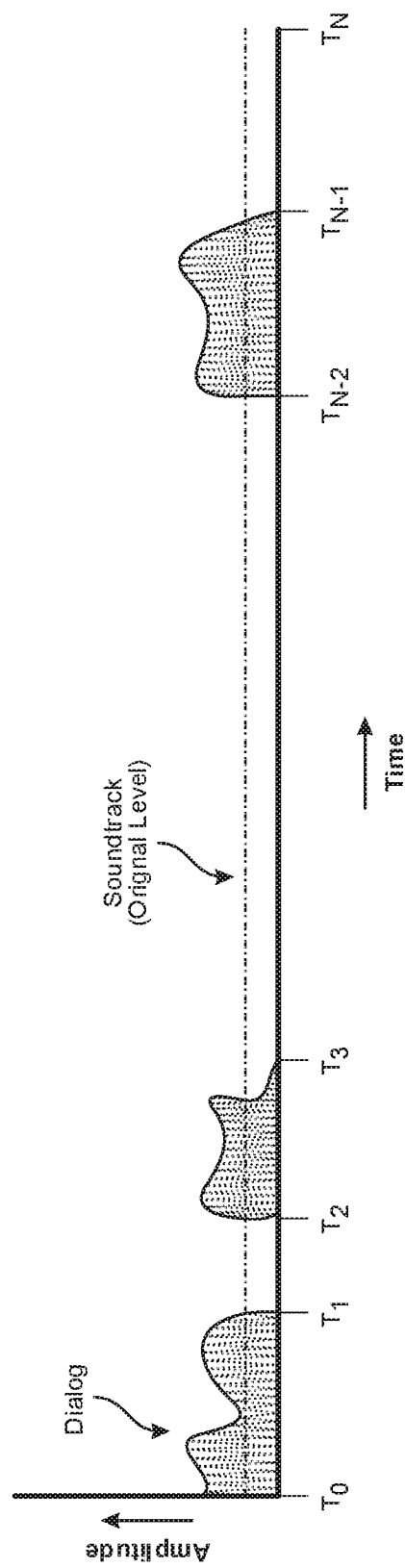

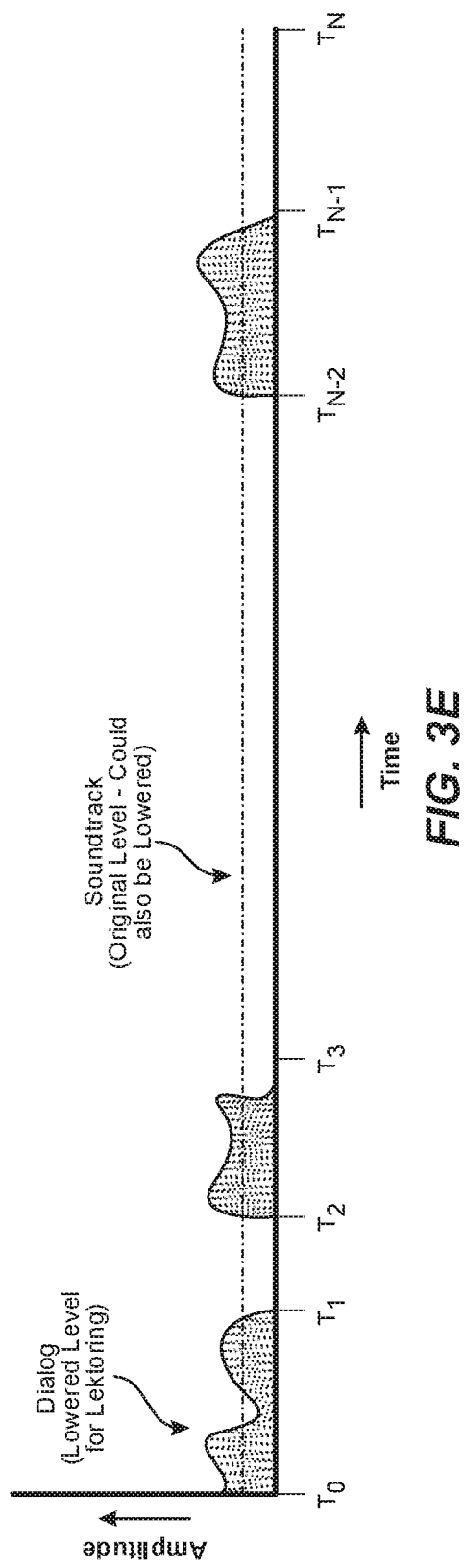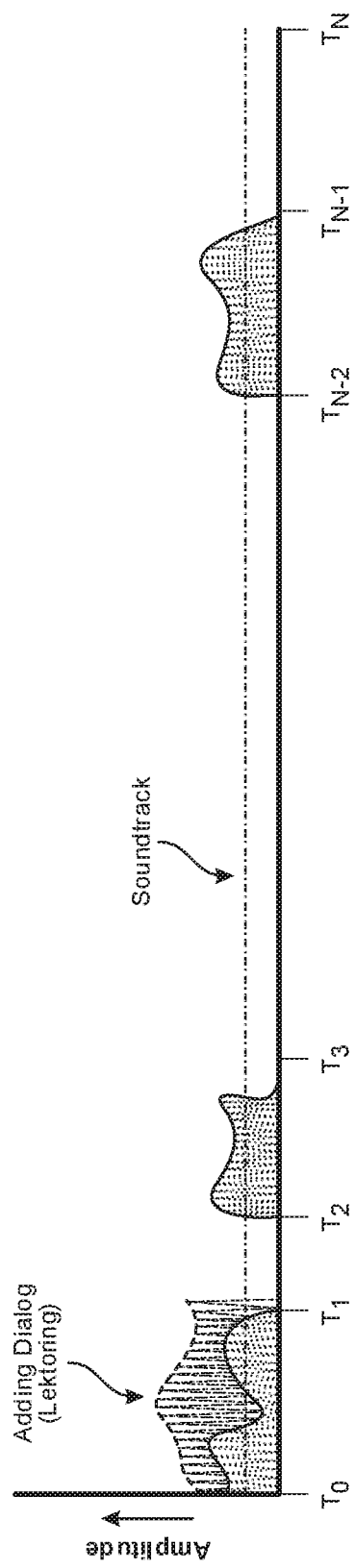
FIG. 3E
FIG. 3F

SYSTEMS AND METHODS FOR MIXING SYNTHETIC VOICE WITH ORIGINAL AUDIO TRACKS

CROSS-REFERENCE TO RELATED APPLICATIONS

This application claims priority to and the benefit of U.S. Provisional Patent Application No. 62/937,755, filed on Nov. 19, 2019, which application is incorporated by reference in its entirety herein.

BACKGROUND

Digital content distribution systems may provide a variety of different types of content (e.g., tv shows, movies, etc.) to end users. This content may include both audio and video data and may be sent to a user's content player as a multimedia stream. As a result, streaming content has become a very popular form of entertainment. The ability to enjoy a film, television program or other form of audiovisual content in the comfort of one's home offers many advantages to viewers. One of these advantages is that of enabling visually impaired viewers to more easily view the displayed content by being able to adjust their position to a more comfortable distance from a screen or other display device than might be available at a movie theater.

However, such visually impaired viewers may still miss certain details in a scene that is displayed, or not be able to recognize certain objects. This can reduce their understanding and enjoyment of the displayed content. For example, a visually impaired viewer may not recognize that a character is holding an object that can explain an element of a plot or that an object in a scene might provide a clue to what is happening. Similarly, a visually impaired viewer may not be able to recognize an expression on a character's face which could add to the viewer's understanding of the character or to the meaning of dialog spoken by the character.

SUMMARY

As will be described in greater detail below, the present disclosure describes systems and methods for mixing a synthesized voice description of a scene or other portion of a video recording with the existing audio track associated with the video recording. The synthesized voice description can be used to provide additional information to a visually impaired viewer without interrupting the audio track that is associated with the video recording, typically by inserting the synthesized voice description into a segment of the audio track in which there is no dialog.

In one example, a computer-implemented method includes accessing an audio track that is associated with a video recording, identifying a section of the accessed audio track having a specific audio characteristic, reducing a volume level of the audio track in the identified section, accessing an audio segment that includes a synthesized voice, and inserting the accessed audio segment into the identified section of the audio track, the inserted segment having a higher volume level than the reduced volume level of the audio track in the identified section.

In one example, the specific audio characteristic is that the identified section is one in which no dialog is spoken.

In one example, the specific audio characteristic is that the identified section is one in which dialog is spoken.

In one example, the volume of the identified section is reduced by an amount between 6 and 12 decibels (dB).

In one example, the volume of the identified section is reduced by an amount of approximately 9 decibels (dB).

In one example, the accessed audio segment includes an audio description of a portion of the video recording.

In one example, the audio description provides additional information regarding the portion of the video recording, where the additional information may include an explanation or description of a scene, an object in a scene, a character's expression, a character's clothing, or a plot element.

In one example, the portion of the video recording for which the additional information is provided corresponds to the section of the audio track where the accessed audio segment is inserted.

In one example, the accessed audio segment includes dialog spoken in a different language than dialog in the audio track prior to implementing the method.

In one example, the method includes processing the accessed audio segment to alter its length in time prior to inserting the audio segment into the identified section of the audio track.

In one example, the processing of the audio segment to alter the segment's length in time includes increasing the length of the audio segment.

In one example, processing of the audio segment to alter the segment's length in time includes decreasing the length of the audio segment.

In one example, the amount of reduction in the volume level of the audio track in the identified section depends upon the audio characteristic of the identified section.

In one example, identifying a section of the accessed audio track having a specific audio characteristic is performed, at least in part, by a machine learning model.

In addition, a corresponding system (e.g., a server, computing device, etc.) is disclosed. The system includes a set of modules stored in an electronic data storage or memory, with each module containing instructions for a computer-implemented process, function, or operation and an electronic processor for executing the instructions. The modules include one or more modules containing instructions for accessing an audio track that is associated with a video recording, identifying a section of the accessed audio track having a specific audio characteristic, reducing a volume level of the audio track in the identified section, accessing an audio segment that includes a synthesized voice, and inserting the accessed audio segment into the identified section of the audio track, the inserted segment having a higher volume level than the reduced volume level of the audio track in the identified section.

In some examples, the above-described method may be encoded as computer-readable instructions on a computer-readable medium. For example, a computer-readable medium may include one or more computer-executable instructions that, when executed by at least one processor of a computing device, may cause the computing device to access an audio track that is associated with a video recording, identify a section of the accessed audio track having a specific audio characteristic, reduce a volume level of the audio track in the identified section, access an audio segment that includes a synthesized voice, and insert the accessed audio segment into the identified section of the audio track, the inserted segment having a higher volume level than the reduced volume level of the audio track in the identified section.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 3C is an illustration of how the soundtrack volume level within a time segment or segments in which no dialog is spoken may be lowered relatively abruptly or gradually decreased to the desired level.

FIG. 3D is an illustration of an example time period from $T_0$ to $T_N$ of an audio track that may be associated with a video recording and is used to illustrate an embodiment in which the original audio track is modified by use of lektoring.

FIG. 3E is an illustration of the audio track of FIG. 3D in which the dialog volume level has been lowered within a time segment or segments in which dialog is spoken.

FIG. 3F is an illustration of the audio track of FIG. 3E in which a new audio segment of dialog (such as used in lektoring) has been inserted within the same time period as original dialog, but at a higher volume level than the lowered volume of the original dialog.

In FIG. 4A the original dialog is lowered in volume abruptly, in FIG. 4B the original dialog is lowered in volume gradually, and in FIG. 4C the original dialog is played at a lowered volume after a slight delay.

Figure 1:
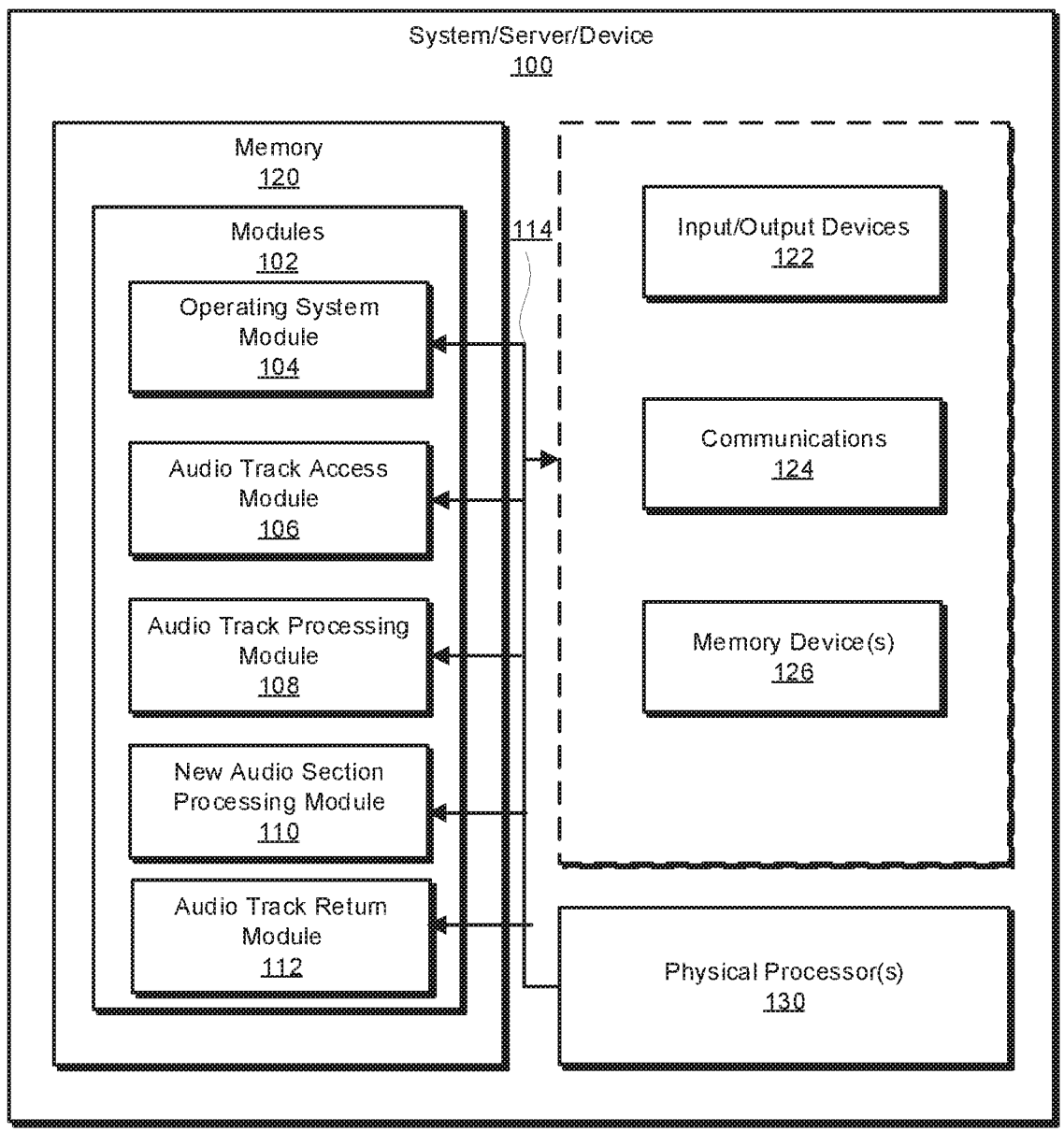
FIG. 1 is a diagram illustrating a system 100 containing a set of modules 102, with each module containing executable instructions that when executed by an electronic processor implement a method for altering an audio track associated with a video recording in accordance with an embodiment of the systems and methods described herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for mixing a new section of an audio track into an existing audio track, where the existing track is associated with a video recording. A multimedia stream used to provide content to viewers will typically include an audio track and a video recording. The audio track and video recording are stored in an electronic data storage element or memory. The two may be combined into a single set of data or stored as separate but associated sets of data. If stored separately, the two sets of data are synchronized or aligned during the streaming process.

As mentioned, visually impaired viewers may miss certain details in a scene that is displayed, or not be able to recognize certain objects. Another possible approach is to overlay a synthesized voice over an existing audio track whenever it is desired to insert additional audio information. However, this may not be effective, as potential overlaps between the existing audio track and the additional audio information can confuse a listener.

Another example of a situation in which an audio track might require alteration for a specific type of viewer is in the process known as "lektoring", which involves adding a voice-over translation of dialog to an audio track. Lektoring typically involves a voice speaking a language that is different from original language of the content item, i.e., hereinafter referred to as the target language. The target language speaking voice is overlaid on top of a portion of an audio track containing the dialog being spoken in the original language by actors in a scene. It is a form of dubbing for an audience that speaks a different language than that originally spoken by the actors in a film or program. One approach to implementing lektoring places the lektoring audio track over the existing dialog portions of a film or program's audio track, which plays in the background. However, this has the disadvantage that the voice-over may be confusing to a listener due to background sounds, such as the original dialog.

Note that although lektoring typically involves an overlay of dialog in a scene spoken in a different language, in some circumstances it may be desirable to introduce a description of an element of a scene or character into an audio track, with that description spoken in a different language than the original dialog. In this example, the methods described herein may be used to introduce an audio segment containing additional audio description spoken in a different language into an audio track, either over dialog or adjacent to it in the audio track. If adjacent to dialog, then the dialog may be subject to overlay by dialog spoken in the different language with the additional audio content inserted adjacent to it.

In one embodiment, the disclosed system and method is used to mix or integrate a synthesized voice description of a portion of a video recording with the existing audio track associated with the recording. The synthesized voice description can be used to provide additional information to a visually impaired viewer without interrupting the audio track that is associated with the video recording. This is accomplished in some examples by inserting the synthesized voice description into a segment of the audio track in which no dialog is being spoken.

In some examples, a segment in which no dialog is spoken may be automatically identified or detected by a substantial reduction in the frequency components associated with speech on the audio track or by another indication of a time period or time slot in which no speech is present. It may also be identified by use of a Voice Activity Detection (VAD) technique. Such a segment may also be identified or detected by use of a machine learning model that has been trained to recognize when a section of audio track is lacking dialog (this may be accomplished by using a set of training data that includes multiple examples of sections of audio track having or lacking dialog and an associated label or indicator of whether dialog is present in that section).

In some examples, the automated process described herein enables a visually impaired viewer to be provided with additional information about a scene in a film or television program that might otherwise not be apparent to them and does so in a more efficient and comprehensible manner than conventional approaches.

In some examples, the automated process described herein provides a way to integrate a dubbed version of dialog into an existing audio track in a more efficient manner than conventional approaches.

As will be described in greater detail, embodiments of the systems and methods described herein enable a visually impaired viewer to obtain greater enjoyment of (or information from) a film or television program. Embodiments described herein improve the conventional mixing process by automatically detecting or identifying specific time slots in which to place new audio content, followed by automatically adjusting the volume level in those time slots and inserting new audio content in a synthesized voice into the time slot or slots at a specific volume level.

As will be described, embodiments of the systems and methods described herein may be used to insert a translation, voice-over audio track, or additional audio description into an existing audio track. In one example, the described technique may be used in implementing a version of "lektoring", in which a voice speaking a different language than that originally spoken in a scene (e.g., a Polish speaking voice) is inserted into the audio track, over the existing dialog. As a result, in lektoring, the new audio is overlapping with the original dialog.

For example, the lowered volume of the original dialog may begin and after a short time (e.g., 1 second, although this time delay is configurable, as is the amount or degree of lowering of the volume level of the original dialog) the new audio containing the dialog spoken in a different language may start. In addition to the example described, instead of being inserted over a portion of the audio track containing existing dialog, in one example, the audio segments containing dialog spoken in a different language may be inserted into a section of the audio track in which no dialog is spoken (e.g., adjacent to the audio track position of the original dialog).

The technique(s) described may also be used to insert an audio description of a scene or character into the audio track. In this example, the new audio content is inserted into the audio track in a region between portions of the track containing spoken dialog. The inserted content may include dialog spoken in a different language or audio descriptions of features or elements of a scene (spoken in the original or in a different language), as described previously.

The following will provide, with reference to FIGS. 1-7, detailed descriptions of a computer-implemented method, function, operation or process for altering an existing audio track associated with a video recording to mix into the track an audio section containing additional information about the associated video recording in an automated and efficient manner. Further, the following will also provide a detailed description of a system, server, or computing device for performing the described method, function, operation or process.

The following will also provide detailed descriptions of a computer-implemented method, function, operation or process for altering an existing audio track associated with a video recording to mix into the track an audio section containing dialog spoken in a different language than in the original audio track in an automated and efficient manner. Further, the following will also provide a detailed description of a system, server, or computing device for performing the described method, function, operation or process.

FIG. 1 is a diagram illustrating a system 100 containing a set of modules 102, with each module containing executable instructions that when executed by an electronic processor implement a method for altering an audio track associated with a video recording, in accordance with an embodiment of the systems and methods described herein.

As shown in the figure, system 100 may represent a server or other form of computing or data processing device. Modules 102 each contain a set of executable instructions, where when the set of instructions is executed by a suitable electronic processor (such as that indicated in the figure by "Physical Processor(s) 130"), system (or server or device) 100 operates to perform a specific process, operation, function or method. Modules 102 are stored in a memory 120, which typically includes an Operating System module 104 that contains instructions used (among other functions) to access and control the execution of the instructions contained in other modules. The modules 102 in memory 120 are accessed for purposes of transferring data and executing instructions by use of a "bus" or communications line 114, which also serves to permit processor(s) 130 to communicate with the modules for purposes of accessing and executing a set of instructions. Bus or communications line 114 also permits processor(s) 130 to interact with other elements of system 100, such as input or output devices 122, communications elements 124 for exchanging data and information with devices external to system 100, and additional memory devices 126.

In some embodiments, the term "audio track" as used herein may refer to a track containing spoken dialog, music, sound effects, a mono track, a stereo track, a MIDI (Musical Instrument Digital Interface) track or environmental sounds.

In some embodiments, the term or phrase "an audio track that is associated with a video recording" as used herein may refer to an audio track containing one or more of spoken dialog, music or background sounds that is meant to be played as part of a combined audio and video presentation.

The combined presentation may be a film or television program, for example. The audio track may be stored separately and combined with a video recording or it may be stored as part of the combined audio and video presentation.

In some embodiments, the term "synthesized" as used herein may refer to an artificially generated voice or sound meant to represent a voice.

As shown in FIG. 1, modules 102 may contain one or more sets of instructions for performing a method that is described with reference to FIG. 2. These modules may include those illustrated but may also include a greater number or fewer number than those illustrated. For example, Audio Track Access Module 106 may contain instructions that when executed perform a process to access an audio track for a film or program. Audio Track Processing Module 108 may contain instructions that when executed perform a process to lower the volume in a specific time slot of an audio track. Module 108 may also contain instructions that when executed cause the volume to be lowered in a specific manner. Similarly, the instructions that cause the volume to be lowered in a specific manner may be contained in a different module.

New Audio Section Processing Module 110 may contain instructions that when executed perform a process to access a previously generated new section of audio description that corresponds to each of the time slots. In some embodiments, the generated section or sections are generated in a synthesized voice and stored in a suitable electronic data storage element. In some embodiments, module 110 adjusts the volume level of each piece of the synthesized audio description and inserts each piece of synthesized audio content into the audio track in (or at) its desired time slot.

Audio Track Return Module 112 may contain instructions that when executed perform a process to store the final audio track in a suitable data storage element. The final audio track may then be combined or recombined with the video recording after appropriate synchronization, thereby resulting in a final version of the film or program in which the new (additional) audio content has been added.

Figure 2:
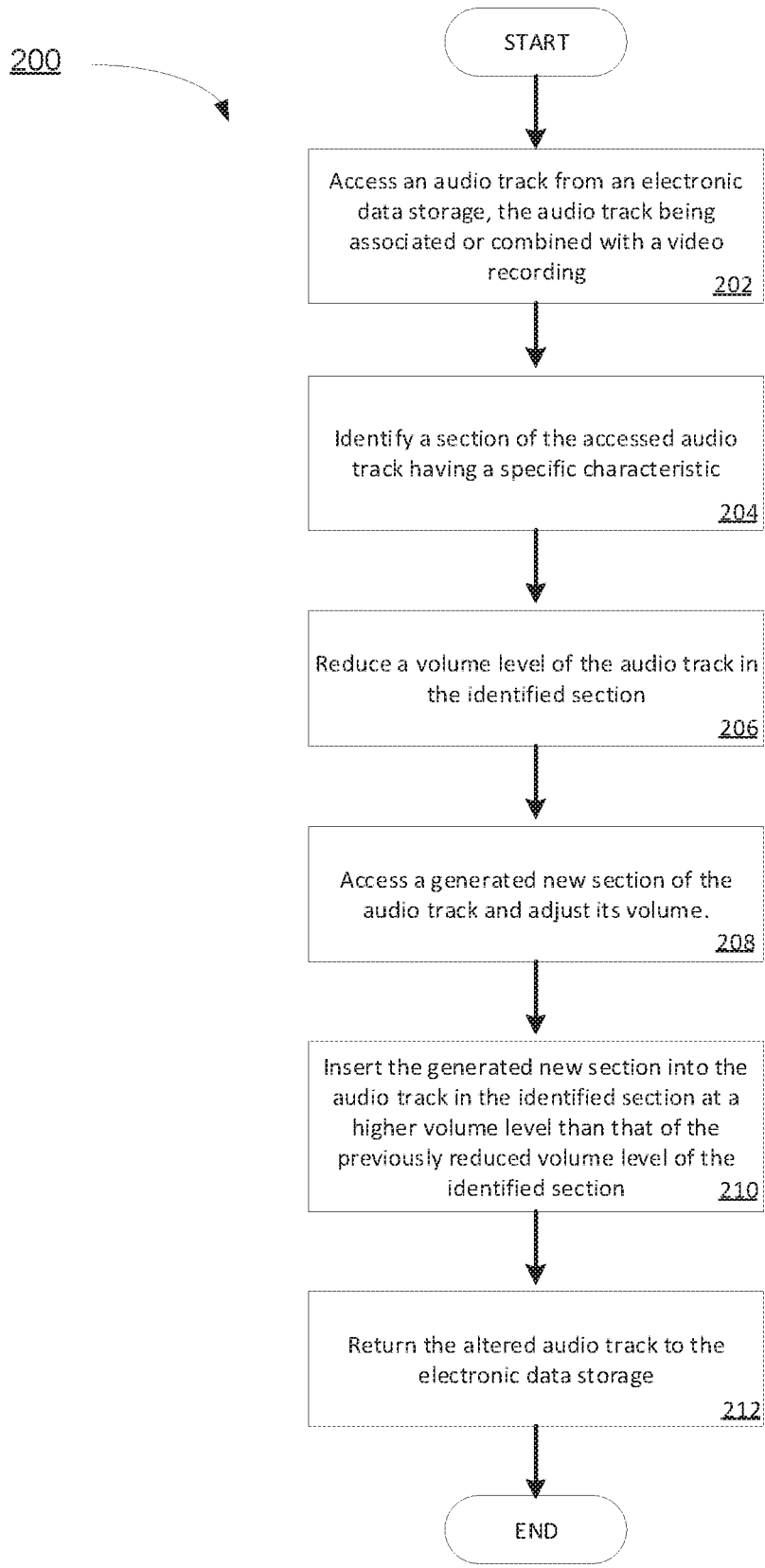
FIG. 2 is a flow chart or flow diagram of an exemplary computer-implemented method, operation, function or process 200 for altering an audio track associated with a video recording in accordance with an embodiment of the systems and methods described herein.

FIG. 2 is a flow chart or flow diagram of an exemplary computer-implemented method, operation, function or process 200 for altering an audio track associated with a video recording in accordance with an embodiment of the systems and methods described herein. In some embodiments, this is performed for the purpose of mixing an audio description of a scene from a film or television program into an existing audio track for the film or program. The steps shown in FIG. 2 may be performed by any suitable computer-executable code and/or computing system, including the system(s) illustrated in FIG. 1. In one example, each of the steps shown in FIG. 2 may represent an algorithm whose structure includes and/or is represented by multiple sub-steps, examples of which will be provided in greater detail below.

As described, a system for implementing the method of FIG. 2 includes an electronic processor (e.g., a CPU, controller, microcontroller, etc.) which accesses a set of software instructions that are stored in an electronic data storage element. Each set of instructions that is used to perform a specific function may be contained in a specific module. The processor executes the stored instructions in a module to perform the specific function or operation.

As illustrated in FIG. 2, at step 202 one or more of the modules described herein operates to cause a computing device to access an audio track for a film or program (e.g., by execution of the instructions contained in module 106 of FIG. 1). The track is stored in an electronic data storage element or memory. The track is stored with its associated video recording in a common memory or in a separate memory. The accessed audio track includes one or more of spoken dialog, music, sound effects, a mono track, a stereo track, a midi track, background sounds or environmental sounds.

In some embodiments, the track is accessed using an automated process that identifies an audio track as part of a combined audio and video project. The track may also be accessed by a process that is coupled to the digital audio workstation (DAW) of a sound engineer (a digital audio workstation is an electronic device or application software used for recording, editing and producing audio files).

The accessed track is processed at step 204 (e.g., by execution of the instructions contained in module 108) to identify or detect one or more time periods (i.e., time sections or segments, sometimes referred to as time slots) in the audio track having a specific audio characteristic. In one example, these one or more time slots represent sections of the audio track in which the new audio content may be inserted during later stages of the mixing or processing.

In some embodiments, the term "section" or "segment" as used herein in reference to an audio track may refer to a time period or time slot that is part of the audio track.

In some embodiments, the term or phrase "specific audio characteristic" as used herein in reference to an audio track may refer to a section of the audio track in which no dialog is spoken or to a section of the audio track in which dialog is spoken. In some embodiments, the term or phrase "specific audio characteristic" may refer to a section of the audio track having a certain volume level, a certain frequency range, a certain maximum frequency, a certain frequency spectrum or other feature.

In some embodiments, the specific sections or time slots identified are those in which no dialog is spoken. That is, the specific audio characteristic is the lack of spoken dialog in the particular section of the audio track. In some embodiments, this is determined by examining the spectral range of audio within a time slot, as spoken dialog will typically be associated with a specific range of frequencies. In some embodiments, other characteristics of spoken dialog may be used to identify or detect the specific time slots. In other embodiments, the specific audio characteristic is that the identified time slots are those in which dialog is spoken.

In some embodiments, a machine learning model is trained to automatically determine one or more time slots or sections of the audio track in which dialog is spoken and/or one or more time slots or sections of the audio track in which dialog is not spoken. As will be described further with reference to FIGS. 6A and 6B, this is accomplished by generating a set of training data for the model that includes multiple examples of sections of audio, some of which include spoken dialog and some of which do not include spoken dialog. The examples are each associated with a label or other indicator of whether they contain or do not contain dialog. The examples and labels are input to the model for purposes of training the model. When trained, the model will operate to respond to an input sample of an audio track by providing an output that indicates whether the input sample contains spoken dialog or does not contain spoken dialog (or contains or does not contain another audio characteristic that the model was trained to identify).

Once the one or more time slots have been identified/detected, the method at step 206 (as implemented by module 108 or a separate set of instructions in a different module) reduces the volume level within each of the detected time slots. This process (sometimes referred to as "ducking") typically lowers the volume level by an amount between 6 and 12 decibels (dB), although other amounts of reduction (either greater or lesser) may be used. One result of the reduction in volume level is to reduce any distraction or confusion to the listener caused by the original audio (such as music or sounds) after insertion of the new audio content. In some embodiments, the reduction in volume level is relatively abrupt, that is the volume level is sharply (i.e., substantially immediately) decreased by the desired amount. In some embodiments, the volume level is gradually decreased over a period of time (e.g., hundreds of milliseconds to 2 seconds) to its final level.

After each of the identified/detected time slots has had its volume reduced, the process accesses a previously generated new section of audio description that corresponds to each of the time slots, as indicated by step 208 (and as implemented by the execution of the set of instructions contained in module 110). In some embodiments, the generated section or sections include a synthesized voice and are stored in a suitable electronic data storage element.

In some embodiments, the term or phrase "an audio segment that includes a synthesized voice" as used herein may refer to a section of an audio track or recording in which there is a synthesized voice speaking dialog or making sounds. The synthesized voice may be in the same language as the original audio track or in a second, different language.

In some embodiments, the generated section(s) include an audio description of a portion of the video recording, such as a description of an object in a scene, a description of a character's appearance, expression or emotional state, a description of the scene environment, etc. In some cases, the generated section(s) are for the purpose of providing a visually impaired viewer with additional information or context regarding a scene. In other embodiments, the generated section(s) contain dialog spoken in a different language than in the original audio track.

In some embodiments, the term or phrase "an audio description of a portion of the video recording" as used herein may refer to spoken dialog, spoken commentary or sounds that are meant to provide additional information to a viewer, where such additional information may include one or more of an explanation or description of a scene, an object in a scene, a character's expression, a character's clothing, or a plot element.

In some embodiments, each of the generated new sections of the audio track are associated with a specific scene or portion of the video recording and from that, with a specific portion of the audio track. In some embodiments, this is done by use of conventional sound mixing technologies or synchronization tools. This allows the method illustrated in FIG. 2 to associate each of the new synthesized pieces of audio description with its corresponding time slot (or in some cases, a time period after the time slot in which dialog for a specific scene is spoken) in the original audio track.

The method then adjusts the volume level of each piece of the synthesized audio description, as also illustrated at step 208. In some embodiments, the adjusted volume level of each piece of synthesized audio description is determined by considering the original volume level in a time slot, i.e., the volume level that was present before it was reduced in step 206. In some embodiments, the adjusted volume level of a new section of audio description is determined by increasing the volume level of the new section so that it is greater than that of the reduced volume level in the audio track for the time slot.

In some embodiments, adjusting the volume of the new section of audio track is performed automatically by a process that increases the volume level of the new section to a pre-determined amount greater than the level to which the volume has been reduced in the corresponding time slot or segment. The pre-determined amount can be expressed as an increased decibel level. The pre-determined amount can be that sufficient (as found via experimental testing) to make the new audio section comprehensible to a listener when the listener hears the new audio content at its adjusted volume and the original audio content at its lowered volume.

The amount of desired volume adjustment can also be determined as a result of using a machine learning model that has been trained to identify when a section of audio track is comprehensible to a listener hearing both an original section of audio at a lowered volume and a new section of audio at a higher volume. Note that the amount of volume adjustment may depend upon the contents of the audio in the original section of the audio track and/or the contents in the new audio track.

Each piece of synthesized audio content is then inserted into the audio track in (or at) its desired time slot, as illustrated at step 210 (and as implemented by the execution of the set of instructions contained in module 110). Additional mixing may be performed (if desired) to gradually increase the volume level of the inserted content to its final desired level. This may be done to reduce any confusion or disruption to the listener.

After insertion of each section of new audio (such as the additional content), and if desired further processing of the volume level for each inserted section, the final audio track for the film or program is stored in a suitable data storage element, as indicated by step 212 (by execution of the instructions contained in module 112). The final audio track may then be combined or recombined with the video recording after appropriate synchronization, thereby resulting in a final version of the film or program in which the new (additional) audio content has been added.

In some embodiments, the length of time of a piece of new (additional) audio description may not match that of the time slot into which it is to be inserted. In such a situation, the time length of the piece to be inserted may be altered by being sped up (if it is longer than the time slot) or slowed down (if it is shorter than the time slot). In either case, the goal is to produce a piece of additional audio description that will fit into a specific time slot without introducing distracting distortion or confusion to a listener.

The process of modifying the time length of a piece of audio track to be inserted into an existing track may be performed automatically by a process that has as inputs the length of time of the time slot in the existing audio track and the length of time of the new section of audio content. The process can compare the two and based on the comparison, process the new section as needed to make it fit into the existing track. The processing may include or more of compression, re-sampling, increasing the playback speed without changing the pitch (e.g., by using a commercially available audio processing tool, such as SOX), decreasing the playback speed (again without changing the pitch), editing the track to remove pauses, etc. These modification processes are described in further detail with reference to FIG. 5.

In some embodiments, the inserted additional audio description is mixed into only the center channel of a multi-channel audio track. In some embodiments, the inserted additional audio description is mixed into other channels of a multi-channel audio track, or into both the center channel and one or more of other channels of the audio track.

In some embodiments, the volume level in the specific section is reduced abruptly, such as by using a cut-off filter. In some embodiments, the volume level in the specific section is reduced gradually, such as by reducing from an original level to a reduced level over a specific time period.

In some embodiments, the volume level of the inserted new section of the audio track is adjusted to gradually increase over a period of time to the volume level of the specific section prior to the section's reduction in volume. In some embodiments, the volume level of the inserted new section is set at the volume level of the specific section prior to the section's reduction in volume without a gradual increase in volume level.

In some embodiments, the amount or degree of reduction in the volume level of the audio track in the specific section is varied depending upon the audio characteristic(s) of the specific section (i.e., containing or lacking dialog, containing or lacking a soundtrack, etc.).

Although the processes and methods described with reference to FIG. 2 may be used to add audio content to a film or program audio track for the purpose of enhancing the information available to a visually impaired viewer, another use of an embodiment of the systems and methods described herein is that of adding a voice-over translation of dialog to an audio track.

As mentioned, lektoring typically involves a different language speaking voice-overlay onto an audio track of the dialog being spoken in an original language by actors in a scene. It is a form of dubbing for an audience that speaks a different language than that spoken by the actors in a film or program. In a use of the processes and methods described herein for purposes of inserting a lektoring audio track, each section of dialog in the lektoring audio track may be inserted into the appropriate time slot corresponding to an interval of no spoken dialog in the original audio track (for example, the time slot following the spoken dialog to which a section of the lektoring audio track relates).

In another embodiment, the time slots of the original audio track in which dialog is spoken are identified and lowered in volume, and the appropriate lektoring section inserted into each time slot. In this embodiment, the time slots in which dialog is being spoken would be "ducked" by a certain amount and then the appropriate lektoring section would be inserted into the audio track at a higher volume level than the volume level of the section after the ducking operation.

Figure 3A:
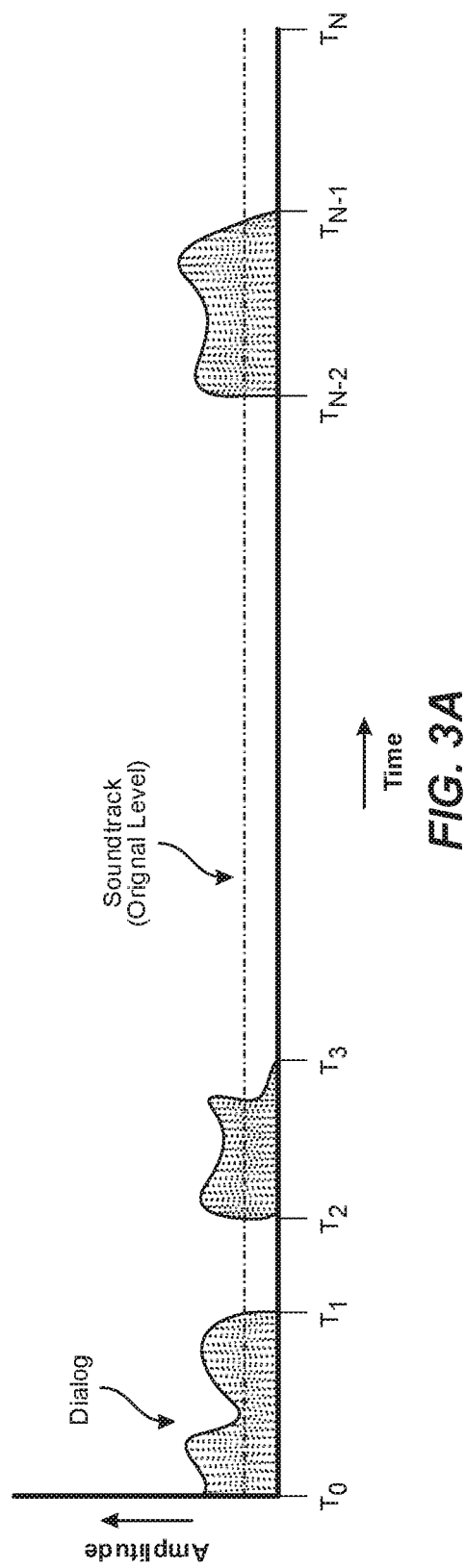
FIG. 3A is an illustration of an example time period from $T_0$ to $T_N$ of an audio track that may be associated with a video recording. As shown, the time period includes multiple time segments or sections, which may contain dialog and/or a soundtrack.

FIG. 3A is an illustration of an example time period from $T_0$ to $T_N$ of an audio track associated with a video recording. As shown, the time period includes multiple time segments or sections, which contain dialog and/or a soundtrack. For example, the time period or segment between $T_0$ and $T_1$ contains both dialog and a soundtrack, with the dialog during that time period varying in amplitude and the soundtrack being at a lower constant amplitude. Similarly, the time periods or segments between $T_1$ and $T_2$ and between $T_3$ and $T_{N-2}$ do not contain dialog but do contain the audio corresponding to the soundtrack.

Figure 3B:
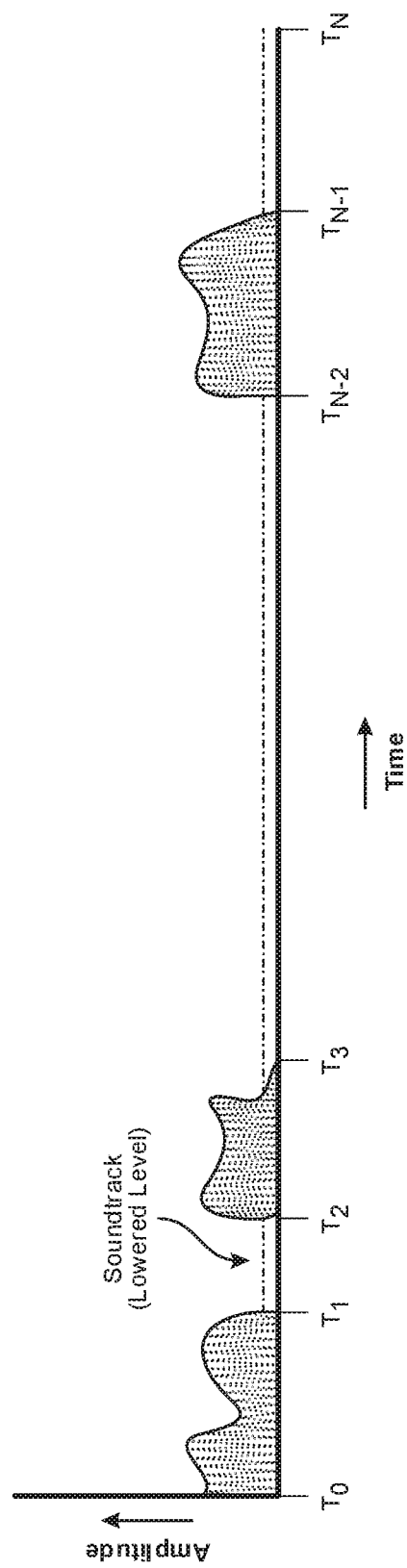
FIG. 3B is an illustration of the audio track of FIG. 3A in which the soundtrack volume level has been lowered within a time segment or segments in which no dialog is spoken.

FIG. 3B is an illustration of the audio track of FIG. 3A in which the soundtrack volume level has been lowered within a time segment or segments in which no dialog is spoken. As shown, the time periods or segments between $T_1$ and $T_2$ and between $T_3$ and $T_{N-2}$ do not contain dialog. In these sections the original volume level or amplitude of the soundtrack has been lowered or reduced by a specific amount. The amount by which the original level of the soundtrack is lowered may depend on the type of additional or new audio being inserted and/or the volume level of the soundtrack (which may include sound effects, music, or background noises).

FIG. 3C is an illustration of how the soundtrack volume level within a time segment or segments in which no dialog is spoken is lowered relatively abruptly or instead gradually decreased to the desired level. As shown, in the time period or segment between $T_1$ and $T_2$ the soundtrack volume level has been lowered relatively abruptly and uniformly to the desired level. In contrast, in the time period or segment between $T_3$ and $T_{N-2}$ the soundtrack volume level has been gradually decreased or increased at the ends of the time period or segment.

FIG. 3D is an illustration of an example time period from $T_0$ to $T_N$ of an audio track that may be associated with a video recording and is used to illustrate an embodiment in which the original audio track is modified by use of lektoring. FIG. 3E is an illustration of the audio track of FIG. 3D in which the dialog volume level has been lowered within a time segment or segments in which dialog is spoken (such as that between $T_0$ and $T_1$ and between $T_2$ and $T_3$). As shown in the figure, the amplitude of the original dialog has been lowered in those time periods. FIG. 3F is an illustration of the audio track of FIG. 3E in which a new audio segment of dialog (such as used in lektoring) has been inserted within the same time period ($T_0$ to $T_1$) as a segment of original dialog, but at a higher volume level than the previously lowered volume of the original dialog. The same technique may of course be used in other time periods.

The reduction in volume entering a time segment is referred to as the "attack" and typically has a duration between 100 ms and 500 ms, with a default value of 250 ms in some instances. This corresponds to an abrupt although not instantaneous reduction in the original volume of the track. The increase in volume exiting a time segment is referred to as the "release" and may have a value in the range between 1000 ms and 2500 ms, with a default value of 2000 ms in some cases. This represents a more gradual increase in volume. Depending on the situation, the beginning or ending of a section of original dialog or other audio over which (or into which) the new audio is to be inserted may be subject to an abrupt, gradual, or delayed increase or decrease in volume level.

Figure 4A:
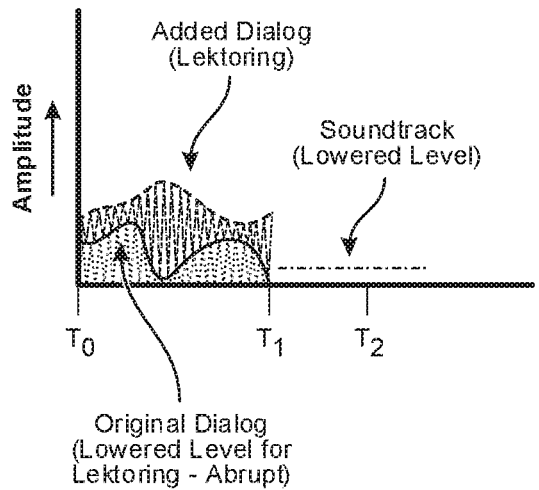
FIGS. 4A, 4B, and 4C are illustrations of example ways in which the original dialog in a time period may be lowered in volume for a case in which dialog used for lektoring will be added.
Figure 4B:
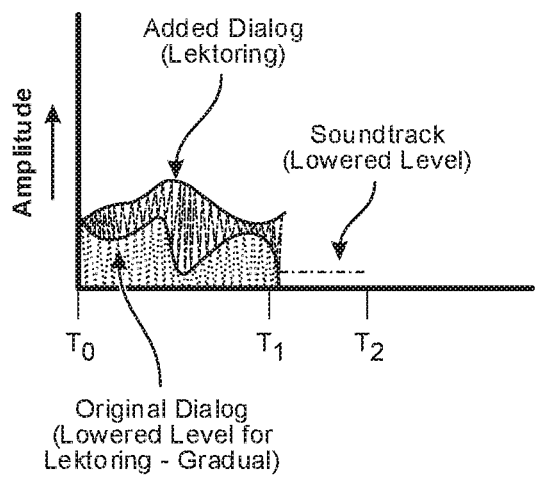
Figure 4C:
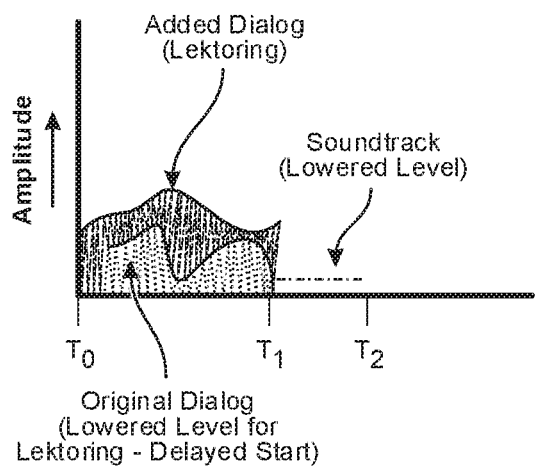

FIGS. 4A, 4B, and 4C are illustrations of example ways in which the original dialog in a time period may be lowered in volume for a case in which dialog used for lektoring will be added. In FIG. 4A the original dialog is lowered in volume abruptly, in FIG. 4B the original dialog is lowered in volume gradually, and in FIG. 4C the original dialog is played at a lowered volume after a slight delay. As shown in FIG. 4C, the original dialog may be heard at a lowered volume level starting at a short time period (e.g., 1 second) after the dialog being spoken in the different language is heard.

Figure 5:
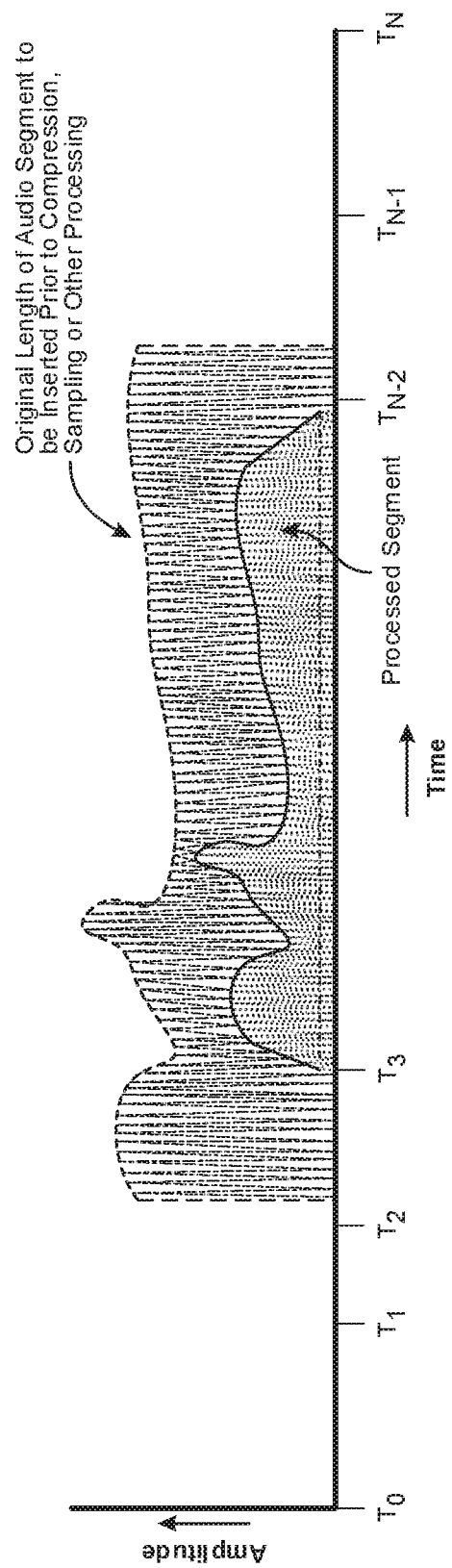
FIG. 5 is an illustration of how the original length in time of an audio track containing additional audio may be processed to adjust its length prior to being inserted into a section of an original audio track.

FIG. 5 is an illustration of how the original length in time of an audio track containing additional audio may be processed to adjust its length prior to being inserted into a section of an original audio track. As shown, in the example the original length of the audio track to be inserted into the time period or segment between $T_3$ and $T_{N-2}$ exceeds the length of the time period. In such a situation, the audio track containing the new audio may require further processing to make its length fit into the available time period. Such further processing or modification may include or more of compression, re-sampling, increasing the playback speed (while maintaining the pitch), decreasing the playback speed (while maintaining the pitch), editing the track to remove pauses, etc. The amount of modification of the new section of audio track may vary depending upon the amount by which the new section needs to be shortened or lengthened to fit the time slot into which it is to be inserted.

As an example, performing a compression process on the new section of audio track involves reducing the amount of data used to store the track. This can reduce the amount of time required to playback the section and hence make it possible to fit the new section into the original length of time available in the desired time slot.

Re-sampling the new section of audio track can be used to achieve a similar result, that is to reduce the amount of data required for the new section and hence the playback time.

Increasing or decreasing the playback speed (while maintaining the pitch) can be used to decrease or increase the length of time required to playback the new section by altering how fast the new section is played. This can be used to alter the total time required for playback of the new section and hence make it possible to fit the new section into the original length of time available in the desired time slot.

Another possible modification is to identify and remove pauses or periods of silence in the new section of track (if it is longer in time than the available time slot) or add periods of silence in between dialog or sounds in the new section of track (if it is shorter in time than the available time slot). In either case, the result is to modify the length of time required for the new section of audio track so that it fits into the desired time slot.

It has been noticed that some neighboring sections of audio description may be very close to each other and may have a minimal time separation between them. In such cases, a default value used for a ducking process may cause releasing and attacking segments of audio to be very close to each other. This may create a noticeable and potentially annoying audio effect to a listener. To reduce this potentially annoying audio effect, in some embodiments, an audio description dialog merging module may be implemented. In operation, the gap between neighboring audio description segments is calculated. In the situation of two descriptions with a separation gap of less than 50 ms, the two segments are merged into one event.

Figure 6A:
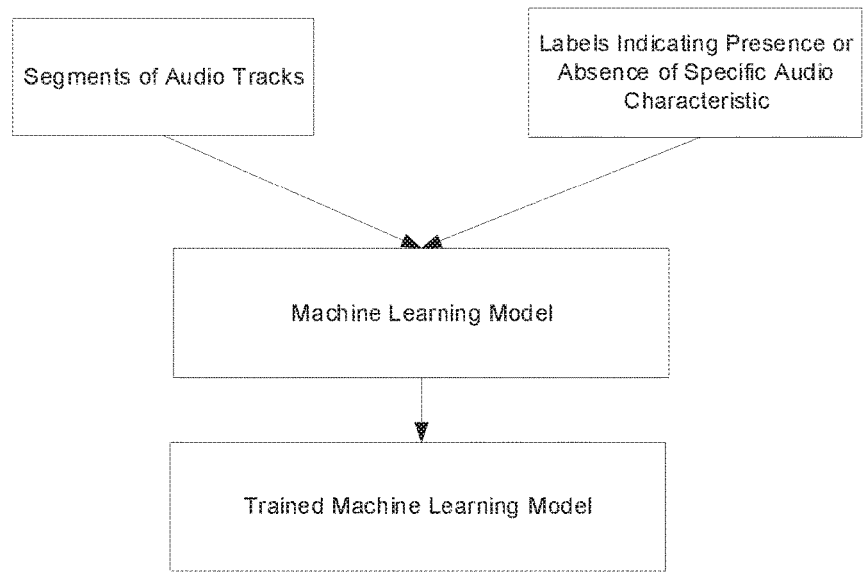
FIG. 6A is an illustration of how a machine learning model may be trained to identify segments or sections of an audio track having a specific audio characteristic.

FIG. 6A is an illustration of how a machine learning model may be trained to identify segments or sections of an audio track having a specific audio characteristic. As shown, in one example, a machine learning model may be trained by using a set of training data. The training data may include (a) segments of audio, with some segments having a specific audio characteristic and some segments lacking the specific audio characteristic, and (b) a corresponding label, indicator, or annotation for each segment specifying the presence or absence of the specific audio characteristic. The audio segments and labels are input to the model to "train" the model. When trained, the model will operate to respond to a new input sample of an audio track by providing an output that indicates whether the input sample has the specific audio characteristic (such as containing dialog) or does not have the specific audio characteristic.

Figure 6B:
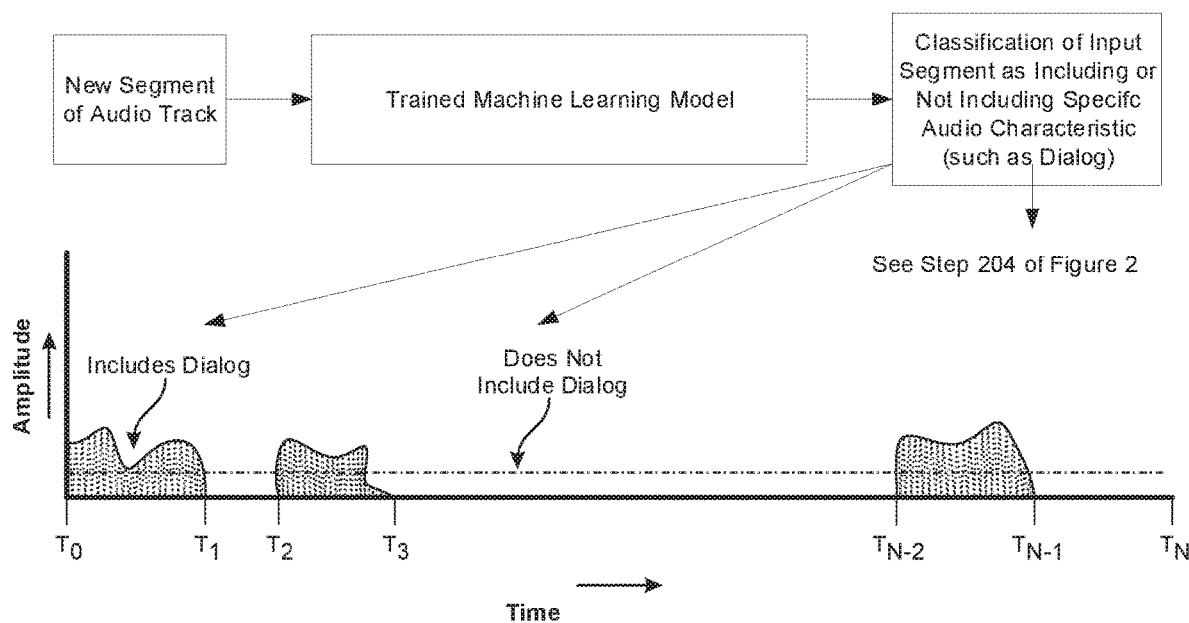
FIG. 6B is an illustration of how the trained machine learning model of FIG. 6A may be used to classify a new segment of an audio track to determine if the new segment includes a specific audio characteristic (such as including or not including dialog).

FIG. 6B is an illustration of how the trained machine learning model of FIG. 6A may be used to classify a new segment of an audio track to determine if the new segment includes a specific audio characteristic (such including or not including dialog). As shown, a new segment or sample of an audio track is input to the trained machine learning model. In response, the model provides an output which represents a classification of the input sample as either including or not including the specific audio characteristic (such as whether the track segment includes spoken dialog or does not include spoken dialog). Thus, for example, the trained model would identify the time segment between $T_0$ and $T_1$ as including spoken dialog, and the time segment between $T_3$ and $T_{N-2}$ as not including spoken dialog.

Figure 7:
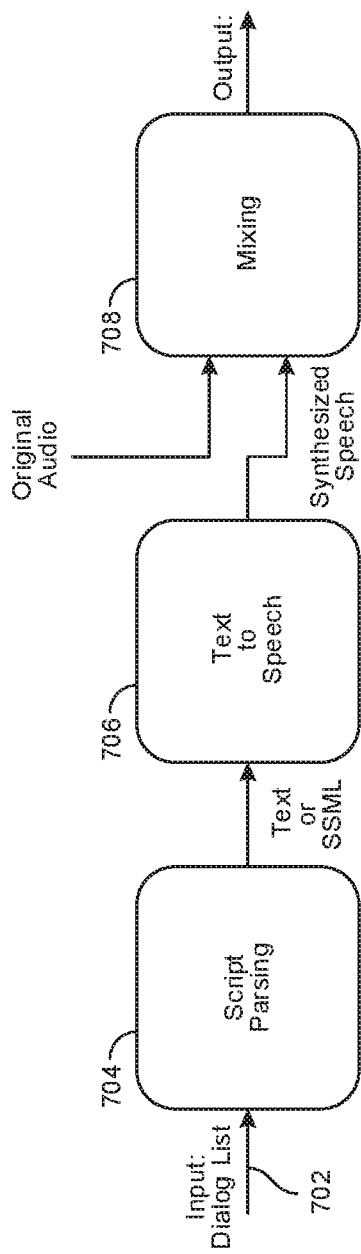
FIG. 7 is a flow diagram illustrating a method, operation, function or process for converting dialog into synthesized speech and mixing the synthesized speech with an original audio track to add an audio description (AD) or a lektor, in accordance with an embodiment of the systems and methods described herein.

FIG. 7 is a flow diagram illustrating a method, operation, function, or process for converting dialog into synthesized speech and mixing the synthesized speech with an original audio track to add an audio description (AD) or a lektor, in accordance with an embodiment of the systems and methods described herein. In general terms, the inputs to the processing pipeline are the target language dialog list and the original audio track. From the dialog list the synthesized speech is generated. In some embodiments, the original audio track could be either stereo or 5.1 audio. The output of the pipeline is the mixed version of synthesized audio and the original audio.

As shown in FIG. 7, the content to be inserted into an audio track is provided as a dialog list 702. The dialog list 702 includes one or more of a translation of the dialog in a film or television program (as would be used in lektoring) or a dialog describing a visual element of the film or program (as would be used in providing an audio description (AD)). The input dialog file may be a spreadsheet file which has the target language dialog list with in-and-out timecodes. To allow for more customization in the synthesized audio, input text may be converted into Speech Synthesis Markup Language (SSML) format. SSML provides details on pauses, formatting for dates, time, speaker pitch and speaking rate.

Continuing the flow in FIG. 7, the input dialog is parsed by a script parser 704. Script parsing involves processing the input dialog list using the following steps: 1) On-screen text and timing extraction, 2) The dialog text, in-and-out time are extracted from the input dialog list file, 3) Markup terms like 'deep breath' and 'overlap' are removed from the dialog text, 4) The date such as year number is converted into 'date formatting' with SSML, 5) To control the speech rate, text can be converted into SSML with a different rate.

The text or SSML output from the parsing operation is then converted to synthesized speech using a text-to-speech engine 706. In some cases, the text-to-speech engine may be provided by a third party. In some cases, the synthesized speech segment may be longer than the assigned time slot. As a result, in some embodiments, the text-to-speech process steps for insertion of an AD (where this may also apply to a lektor segment in some cases) may include the following: 1) Call a text-to-speech engine (whether local or third party) to generate the synthesized speech, 2) Measure the synthesized speech length, and 3) If length is longer than the assigned time slot length: Calculate the speed up ratio, and Call text to speech second time with new speech rate.

In some embodiments, the new audio description as expressed in synthesized speech may be altered with regards to its speaking rate in order to reduce the time required for a specific item of dialog to be described. The generated synthesized speech is then mixed with the original audio track by an automated mixing process 708 (as generally described above with reference to FIGS. 1-6(*b*)).

Accordingly, the present disclosure is directed to systems and methods for mixing a new section of an audio track into an existing audio track, where the existing track is associated with a video recording. More specifically, the disclosure is directed to systems and methods for mixing a synthesized voice description of a portion of a video recording with the existing audio track associated with the recording. The synthesized voice description can be used to provide additional information to a visually impaired viewer without interrupting the audio track that is associated with the video recording, typically by inserting the synthesized voice description into a segment of the audio track in which there is no dialog. The automated process described herein enables a visually impaired viewer to be provided with additional information about a scene in a film or television program that might otherwise not be apparent to them and does so in a more efficient and comprehensible manner than conventional approaches.

Embodiments of the system and methods described herein enable a visually impaired viewer to obtain greater enjoyment of (or information from) a film or television program by implementing an improvement to the conventional way in which an audio track associated with a video is modified or enhanced by a human sound mixer. Instead of a manual and time consuming process involving a sound mixer and a voice actor or one in which a synthesized voice is overlaid on top of an existing sound track, the embodiments described herein improve the conventional mixing process by automatically detecting or identifying specific time slots in which to place new audio content, followed by automatically adjusting the volume level in those time slots and inserting new audio content in a synthesized voice into the time slot or slots at a specific volume level.

Embodiments of the system and methods described herein may also (or instead) be used to insert an audio section containing dialog spoken in a different language into an audio track in an automated and efficient manner, and one in which the inserted section is more comprehensible to a listener.

Example Embodiments

1. A computer-implemented method, comprising: accessing an audio track that is associated with a video recording; identifying a section of the accessed audio track having a specific audio characteristic; reducing a volume level of the audio track in the identified section; accessing an audio segment that includes a synthesized voice; and inserting the accessed audio segment into the identified section of the audio track, the inserted audio segment having a higher volume level than the reduced volume level of the audio track in the identified section.

2. The computer-implemented method of claim 1, wherein the specific audio characteristic is that the identified section includes no spoken dialog.

3. The computer-implemented method of claim 2, wherein the volume is reduced by an amount between 6 and 12 decibels (dB).

4. The computer-implemented method of claim 2, wherein the accessed audio segment includes an audio description of a portion of the video recording.

5. The computer-implemented method of claim 4, wherein the audio description provides additional information regarding the portion of the video recording, the additional information including an explanation or description of one or more of a scene, an object in a scene, a character's expression, a character's clothing, or a plot element.

6. The computer-implemented method of claim 5, wherein the portion of the video recording for which the additional information is provided corresponds to the inserted section of the audio track.

7. The computer-implemented method of claim 2, wherein the accessed audio segment includes dialog spoken in a different language than dialog in the audio track prior to implementing the method.

8. The computer-implemented method of claim 1, wherein the specific audio characteristic is that the identified section includes spoken dialog.

9. The computer-implemented method of claim 8, wherein the volume is reduced by an amount of approximately 9 decibels (dB).

10. The computer-implemented method of claim 1, further comprising processing the audio segment to alter the segment's length in time prior to inserting the audio segment into the identified section of the audio track.

11. The computer-implemented method of claim 10, wherein the processing of the audio segment to alter the segment's length in time further comprises increasing the length of time of the audio segment.

12. The computer-implemented method of claim 10, wherein the processing of the audio segment to alter the segment's length in time further comprises decreasing the length of time of the audio segment.

13. The computer-implemented method of claim 1, wherein the amount of reduction in the volume level of the audio track in the identified section depends upon the audio characteristic of the identified section.

14. The computer-implemented method of claim 1, wherein identifying a section of the accessed audio track having a specific audio characteristic is performed, at least in part, by a machine learning model.

15. A system comprising: at least one physical electronic processor; and a physical electronic memory comprising computer-executable instructions that, when executed by the physical electronic processor, cause the physical electronic processor to: access an audio track that is associated with a video recording; identify a section of the accessed audio track having a specific audio characteristic; reduce a volume level of the audio track in the identified section; access an audio segment that includes a synthesized voice; and insert the accessed audio segment into the identified section of the audio track, the inserted segment having a higher volume level than the reduced volume level of the audio track in the identified section.

16. The system of claim 15, wherein the specific audio characteristic is that the identified section is one in which no dialog is spoken, and the audio segment includes an audio description of a portion of the video recording.

17. The system of claim 16, wherein the audio description provides additional information regarding the portion of the video recording, the additional information including an explanation or description of at least one of a scene, an object in a scene, a character's expression, a character's clothing, or a plot element.

18. The system of claim 15, wherein the audio segment is processed to alter its length in time prior to inserting the audio segment into the identified section of the audio track, and further, wherein the processing may vary depending upon the amount by which the audio segment needs to be shortened or lengthened to fit the time slot into which it is to be inserted.

19. A non-transitory computer-readable medium comprising one or more computer-executable instructions that, when executed by at least one processor of a computing device, cause the computing device to: access an audio track that is associated with a video recording; identify a section of the accessed audio track having a specific audio characteristic; reduce a volume level of the audio track in the identified section; access an audio segment that includes a synthesized voice; and insert the accessed audio segment into the identified section of the audio track, the inserted segment having a higher volume level than the reduced volume level of the audio track in the identified section.

20. The non-transitory computer-readable medium of claim 19, further comprising one or more computer-executable instructions that, when executed by at least one processor of a computing device, cause the computing device to process the audio segment to alter its length in time prior to inserting the audio segment into the identified section of the audio track.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical electronic processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to make a decision or perform another function, and store the result of the transformation. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    accessing audio of an audio track that is associated with a video recording, the audio including one or more different contents;
    detecting, within an identified section of the audio track, presence of spoken dialog;
    in response to detecting the presence of the spoken dialog within the identified section of the audio track, reducing a volume level of the audio track in the identified section or in an additional section of the audio track following the identified section;
    accessing an audio segment that includes additional spoken dialog; and
    modifying the audio track by inserting the accessed audio segment into the identified section or the additional section of the audio track, the inserted audio segment having a higher volume level than the reduced volume level of the audio track in the identified section or the additional section, wherein the reduction in volume level of the audio track is variable and depends on the contents of the audio track, such that audio tracks having different contents are subject to larger or smaller reductions in volume level.

2. The computer-implemented method of claim 1, wherein detecting the presence of the spoken dialog comprises automatically detecting the presence of the spoken dialog.

3. The computer-implemented method of claim 1, further comprising processing the audio segment to alter a length of time of the audio segment prior to inserting the audio segment into the identified section of the audio track.

4. The computer-implemented method of claim 3, wherein the processing of the audio segment to alter the length of time of the audio segment further comprises at least one of increasing or decreasing the length of time of the audio segment to match a length of time of the identified section of the audio track.

5. The computer-implemented method of claim 1, wherein an amount of reduction in the volume level of the audio track in the identified section depends upon at least one characteristic of the identified section.

6. The computer-implemented method of claim 5, wherein:
the characteristic of the identified section comprises presence of a soundtrack within the identified section; and
the amount of reduction in the volume level of the audio track in the identified section depends upon the presence of the soundtrack.

7. The computer-implemented method of claim 1, wherein detecting the presence of the spoken dialog within the identified section of the audio track is performed, at least in part, by training a machine learning model to classify samples of audio tracks as containing or not containing spoken dialog and classifying the identified section of the audio track using the trained machine learning model.

8. The computer-implemented method of claim 1, wherein detecting the presence of the spoken dialog within the identified section of the audio track is performed, at least in part, by a Voice Activity Detection (VAD) technique.

9. The computer-implemented method of claim 1, wherein:
the volume level of the audio track is reduced in the identified section of the audio track; and
the accessed audio segment is inserted into the identified section of the audio track.

10. The computer-implemented method of claim 1, wherein:
the volume level of the audio track is reduced in the additional section of the audio track following the identified section of the audio track; and
the accessed audio segment is inserted into the additional section of the audio track following the identified section of the audio track.

11. The computer-implemented method of claim 1, wherein the additional spoken dialog is a translation of the spoken dialog.

12. The computer-implemented method of claim 1, wherein reducing the volume level of the audio track in the identified section or in the additional section comprises:
determining an amount to reduce the volume level of the audio track in the identified section that causes the additional spoken dialog to be comprehensible to a listener hearing both the additional spoken dialog and the spoken dialog;
reducing the volume level of the audio track in the identified section by the amount.

13. The computer-implemented method of claim 1, further comprising increasing, before inserting the accessed audio segment into the identified section of the audio track, the volume level of the accessed audio segment by:
determining an amount to increase the volume level of accessed audio segment that causes the additional spoken dialog to be comprehensible to a listener hearing both the additional spoken dialog and the spoken dialog; and
increasing the volume level of the accessed audio segment by the amount.

14. A system comprising:
at least one physical electronic processor; and
a physical electronic memory comprising computer-executable instructions that, when executed by the physical electronic processor, cause the physical electronic processor to:
access audio of an audio track that is associated with a video recording, the audio including one or more different contents;
detect, within an identified section of the audio track, presence of spoken dialog;
reduce a volume level of the audio track in the identified section or in an additional section of the audio track following the identified section;
access an audio segment that includes additional spoken dialog; and
modify the audio track by inserting the accessed audio segment into the identified section or the additional section of the audio track, the inserted audio segment having a higher volume level than the reduced volume level of the audio track in the identified section or the additional section, wherein the reduction in volume level of the audio track is variable and depends on the contents of the audio track, such that audio tracks having different contents are subject to larger or smaller reductions in volume level.

15. The system of claim 14, wherein the audio segment is processed to alter its length in time prior to inserting the audio segment into the identified section of the audio track, and further, wherein the processing varies depending upon the amount by which the audio segment needs to be shortened or lengthened to fit a time slot in the audio track into which it is to be inserted.

16. The system of claim 14, wherein the volume level of the audio track in the identified section is reduced an amount that causes the additional spoken dialog to be comprehensible to a listener hearing both the additional spoken dialog and the spoken dialog.

17. The system of claim 14, wherein the physical electronic memory comprises additional computer-executable instructions that, when executed by the physical electronic processor, cause the physical electronic processor to:
determining, before the accessed audio segment is inserted into the identified section of the audio track, an amount to increase the volume level of the accessed audio segment that causes the additional spoken dialog to be comprehensible to a listener hearing both the additional spoken dialog and the spoken dialog; and
increase the volume level of the accessed audio segment by the amount.

18. The system of claim 14, wherein the additional spoken dialog is a translation of the spoken dialog.

19. A non-transitory computer-readable medium comprising one or more computer-executable instructions that, when executed by at least one processor of a computing device, cause the computing device to:

access audio of an audio track that is associated with a video recording, the audio including one or more different contents;

detect, within an identified section of the audio track, presence of spoken dialog;

in response to detecting the presence of the spoken dialog within the identified section of the audio track, reduce a volume level of the audio track in the identified section or in an additional section of the audio track following the identified section;

access an audio segment that includes additional spoken dialog; and modify the audio track by inserting the accessed audio segment into the identified section or the additional section of the audio track, the inserted segment having a higher volume level than the reduced volume level of the audio track in the identified section or the additional section, wherein the reduction in volume level of the audio track is variable and depends on the contents of the audio track, such that audio tracks having different contents are subject to larger or smaller reductions in volume level.

20. The non-transitory computer-readable medium of claim 19, further comprising one or more computer-executable instructions that, when executed by at least one processor of a computing device, cause the computing device to process the audio segment to alter its length in time prior to inserting the audio segment into the identified section of the audio track.

* * * * *